United States Patent
Lee et al.

(10) Patent No.: US 9,813,547 B2
(45) Date of Patent: Nov. 7, 2017

(54) PROVIDING CONTENT TO A CHILD MOBILE DEVICE VIA A PARENT MOBILE DEVICE

(71) Applicant: Verizon Patent and Licensing Inc., Arlington, VA (US)

(72) Inventors: Woo Beum Lee, Basking Ridge, NJ (US); Jeffrey M. Walsh, Verona, NJ (US); Michelle Felt, Randolph, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/717,052

(22) Filed: May 20, 2015

(65) Prior Publication Data

US 2016/0344861 A1 Nov. 24, 2016

(51) Int. Cl.
| | | |
|---|---|---|
| *H04M 3/00* | (2006.01) | |
| *H04W 4/00* | (2009.01) | |
| *G06F 15/16* | (2006.01) | |
| *H04M 1/725* | (2006.01) | |
| *H04W 4/12* | (2009.01) | |
| *H04W 12/06* | (2009.01) | |
| *H04M 15/00* | (2006.01) | |
| *H04L 12/58* | (2006.01) | |
| *H04L 29/06* | (2006.01) | |
| *H04W 12/00* | (2009.01) | |
| *H04M 3/42* | (2006.01) | |
| *H04M 1/677* | (2006.01) | |
| *H04W 88/02* | (2009.01) | |

(52) U.S. Cl.
CPC ........ *H04M 1/72577* (2013.01); *H04L 51/00* (2013.01); *H04L 63/0227* (2013.01); *H04M 3/42382* (2013.01); *H04M 15/58* (2013.01); *H04W 4/12* (2013.01); *H04W 12/00* (2013.01); *H04W 12/06* (2013.01); *H04M 1/677* (2013.01); *H04M 3/4217* (2013.01); *H04W 88/02* (2013.01)

(58) Field of Classification Search
CPC ........... H04M 1/72577; H04M 3/4217; H04M 15/58; H04W 4/12; H04W 12/06
USPC ....................................................... 455/419
See application file for complete search history.

(56) References Cited

U.S. PATENT DOCUMENTS

| | | | | |
|---|---|---|---|---|
| 2002/0143773 | A1* | 10/2002 | Spicer ..................... | H04L 41/28 |
| 2003/0005135 | A1* | 1/2003 | Inoue ...................... | G06F 21/10 |
| | | | | 709/229 |
| 2004/0093325 | A1* | 5/2004 | Banerjee ............. | G06F 17/3087 |
| 2004/0111404 | A1* | 6/2004 | Mano .................... | G06F 17/279 |
| 2006/0166686 | A1* | 7/2006 | Kim ........................ | H04W 4/06 |
| | | | | 455/466 |
| 2006/0224885 | A1* | 10/2006 | Lillie .................... | H04L 63/061 |
| | | | | 713/153 |

(Continued)

*Primary Examiner* — Rafael Pérez-Gutiérrez
*Assistant Examiner* — Mark G Pannell (57) ABSTRACT

A device may receive one or more preferences for providing a message-based data service. The device may receive, in a text message and from a mobile device, a content request. The content request may identify content to be obtained via a data connection. The device may filter the content request, based on the one or more preferences, to generate a filtered request. The device may obtain the content based on the filtered request and via a data connection. The device may process the content to prepare the content for providing in a text message. The device may provide the content to the mobile device in a text message after processing the content.

20 Claims, 8 Drawing Sheets

(56) References Cited

U.S. PATENT DOCUMENTS

| | | | |
|---|---|---|---|
| 2008/0014974 A1* | 1/2008 | Zhao | H04L 12/585 455/466 |
| 2008/0162438 A1* | 7/2008 | Szeto | G06F 17/30985 |
| 2009/0063452 A1* | 3/2009 | Ahn | G06F 17/30029 |
| 2010/0159883 A1* | 6/2010 | Pascal | H04L 12/581 455/412.1 |
| 2011/0225286 A1* | 9/2011 | Francis | H04L 63/0272 709/224 |
| 2014/0204834 A1* | 7/2014 | Singh | H04W 40/22 370/315 |

* cited by examiner

PROVIDING CONTENT TO A CHILD MOBILE DEVICE VIA A PARENT MOBILE DEVICE

BACKGROUND

A mobile device, such as a smartphone, a tablet computer, or the like, may communicate with a cellular network to upload and/or download data, such as text, images, videos, audio, or the like. A subscriber may be charged for data usage by the mobile device when uploading and/or downloading the data.

DETAILED DESCRIPTION OF PREFERRED EMBODIMENTS

The following detailed description of example implementations refers to the accompanying drawings. The same reference numbers in different drawings may identify the same or similar elements.

A mobile device may upload and/or download information via a cellular network (e.g., a long term evolution (LTE) network, a third generation (3G) network, a fourth generation (4G) network, etc.) and a subscriber may be charged based on data used by the mobile device during the uploading and/or downloading. In some instances, the subscriber may be an entity other than a user of the mobile device. For example, the subscriber may be a parent of a child who uses the mobile device, an employer whose employee uses the mobile device, or the like. The subscriber may want to limit data usage and/or content access by the mobile device, while still providing the mobile device and/or the user with access to useful information (e.g., textual search results, textual emergency information, etc.). Implementations described herein may assist the subscriber in limiting the data usage and/or content access by the user of the mobile device, and may assist the subscriber in providing the mobile device with access to useful information without accessing a cellular data service.

Figure 1:
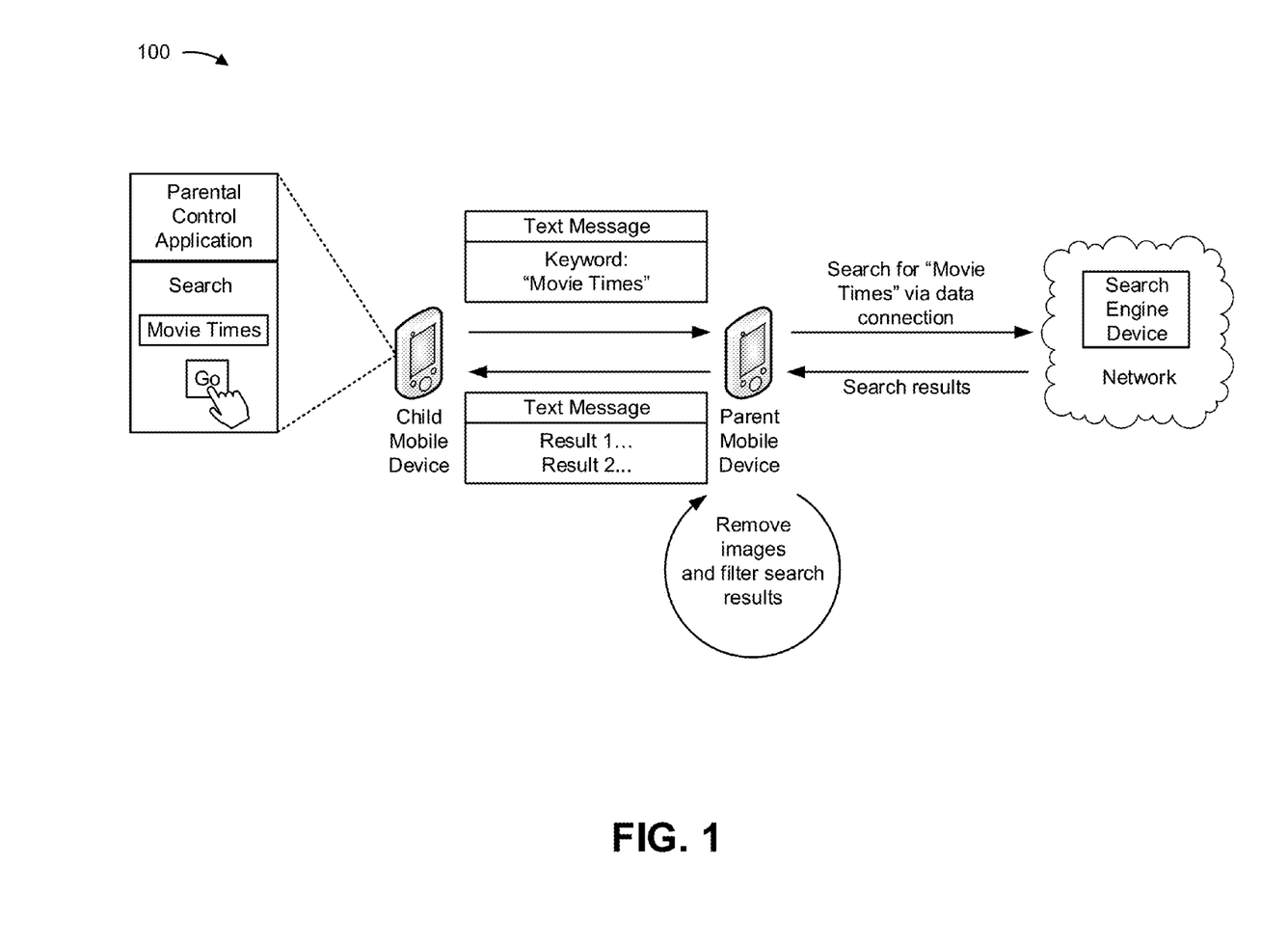
FIG. 1 is a diagram of an overview of an example implementation described herein.

FIG. 1 is a diagram of an overview of an example implementation 100 described herein. As shown in FIG. 1, a child mobile device may communicate with a parent mobile device via text message. For the purpose of FIG. 1, assume that the parent mobile device hosts a control application to control and/or monitor content access and data usage by the child mobile device. Assume further that the child mobile device is unable to access content via a cellular data connection.

As shown in FIG. 1, a control application of the child mobile device may receive a search query (e.g., "Movie Times"). As further shown, the child mobile device may provide the search query to a parent mobile device in a message (e.g., "Keyword: "Movie Times""). Assume that the parent mobile device receives the message. As shown, the parent mobile device may provide the search query to a search engine device via a data connection to a network. As shown, assume that the parent mobile device receives search results based on providing the search query to the search engine device.

As shown, the parent mobile device may remove non-textual content (e.g., images, video, etc.) from the search results to facilitate providing the search results via a text message. As further shown, the parent mobile device may filter the search results (e.g., based on preferences, such as filter rules specified by a user of the parent mobile device, default filter rules, etc.) to remove prohibited content. As shown, the parent mobile device may provide the search results to the child mobile device in a text message (e.g., shown as "Result 1 . . . , Result 2 . . . "). Assume that the child mobile device provides the text message and the search results for display to a user of the child mobile device. In this way, the parent mobile device may monitor and/or control access, by the child mobile device, to content via a cellular data connection of the parent mobile device. The parent mobile device may further provide content to the child mobile device via a text message, which may enable the child mobile device to access useful information without a cellular data connection.

Figure 2:
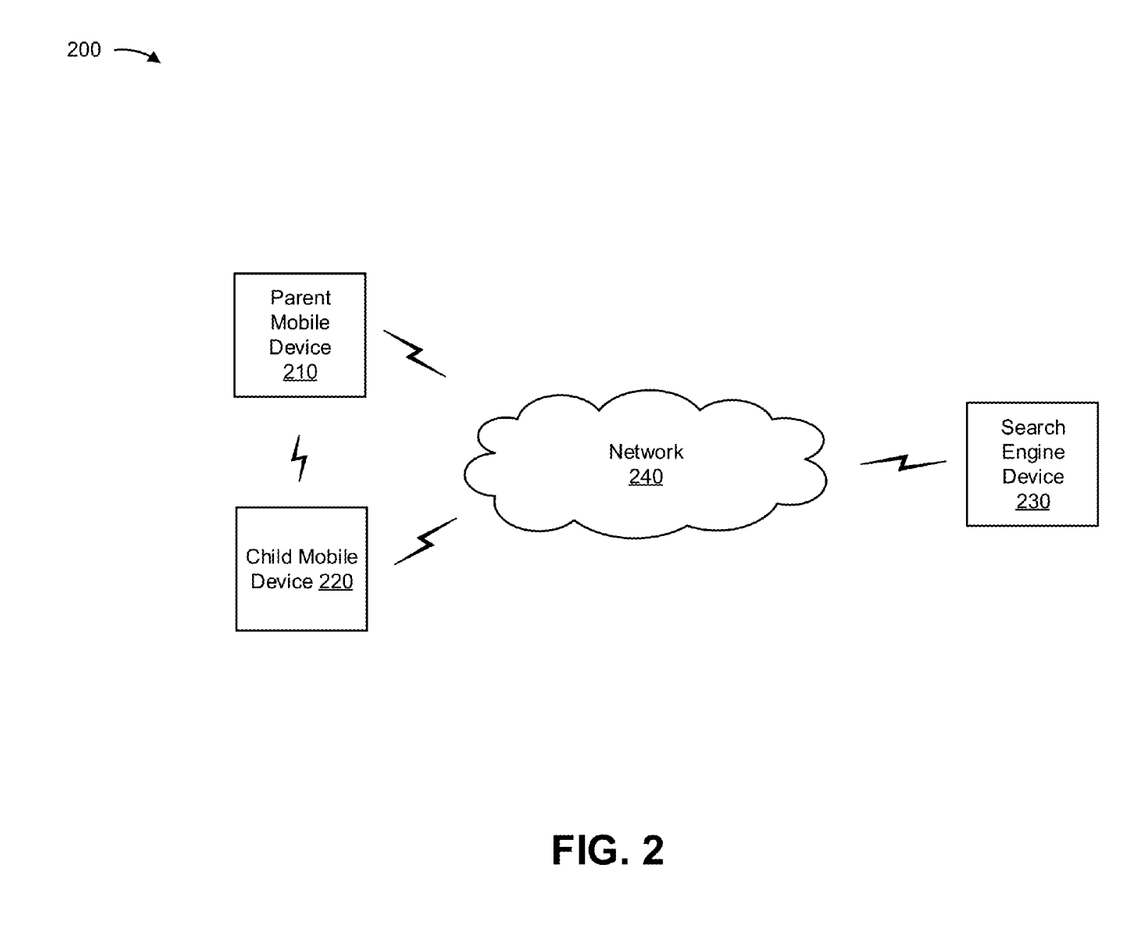
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a parent mobile device 210, a child mobile device 220, a search engine device 230, and/or a network 240. Devices of environment 200 may interconnect via wired connections, wireless connections, or a combination of wired and wireless connections.

Parent mobile device 210 may include one or more devices capable of receiving, generating, storing, processing, and/or providing information. For example, parent mobile device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, etc.), or a similar type of device. In some implementations, parent mobile device 210 may receive a message (e.g., a short message service (SMS) message, etc.), that includes a content request, from child mobile device 220. Parent mobile device 210 may obtain content based on the content request (e.g., via a cellular data connection, via a wireless Internet connection, by providing a search query to search engine device 230, etc.). In some implementations, parent mobile device 210 may host a control application that performs operations related to providing message-based data services to child mobile device 220.

Child mobile device 220 may include one or more devices capable of receiving, generating, storing, processing, and/or providing information. For example, child mobile device 220 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, etc.), or a similar type of device. In some implementations, child mobile device 220 may not be capable of accessing content via a cellular data service. For example, child mobile device 220 may not subscribe to a cellular data service, may be restricted from accessing the cellular data service based on reaching a data usage threshold, may be prevented from accessing the cellular data service, or the like. Child mobile device 220 may prepare a message (e.g., an SMS message, etc.) that includes a content request, and may provide the message, including the content request, to parent mobile device 210. Child mobile device 220 may receive, from parent mobile device 210 and/or in a message, content based on the content request.

Search engine device 230 may include one or more devices capable of receiving, generating, storing, processing, and/or providing search queries and/or search results. For example, search engine device 230 may include a server device, a collection of server devices, or a similar device. Search engine device 230 may receive search queries from parent mobile device 210 or another device, and may determine search results (e.g., documents relating to the search queries) by searching an index based on the search queries. Search engine device 230 may generate a ranked list of the search results (e.g., based on a ranking algorithm) and may provide the ranked list of the search results to parent mobile device 210 or another device (e.g., child mobile device 220). In some implementations, search engine device 230 may be another type of content provider, such as a database device, a media server device, or the like.

Network 240 may include one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
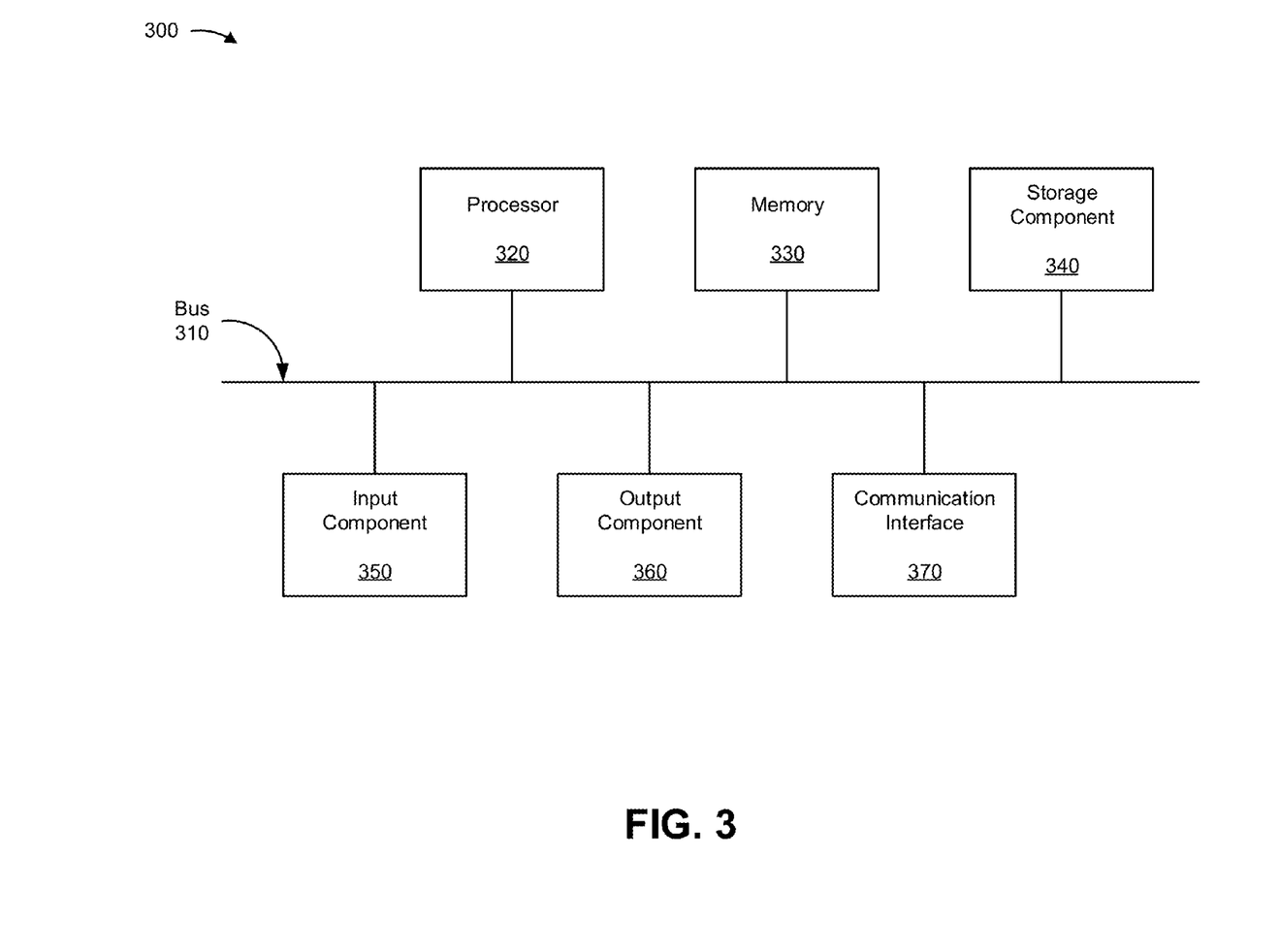
FIG. 3 is a diagram of example components of one or more devices of FIG. 2.

FIG. 3 is a diagram of example components of a device 300. Device 300 may correspond to parent mobile device 210, child mobile device 220, and/or search engine device 230. In some implementations, parent mobile device 210, child mobile device 220, and/or search engine device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
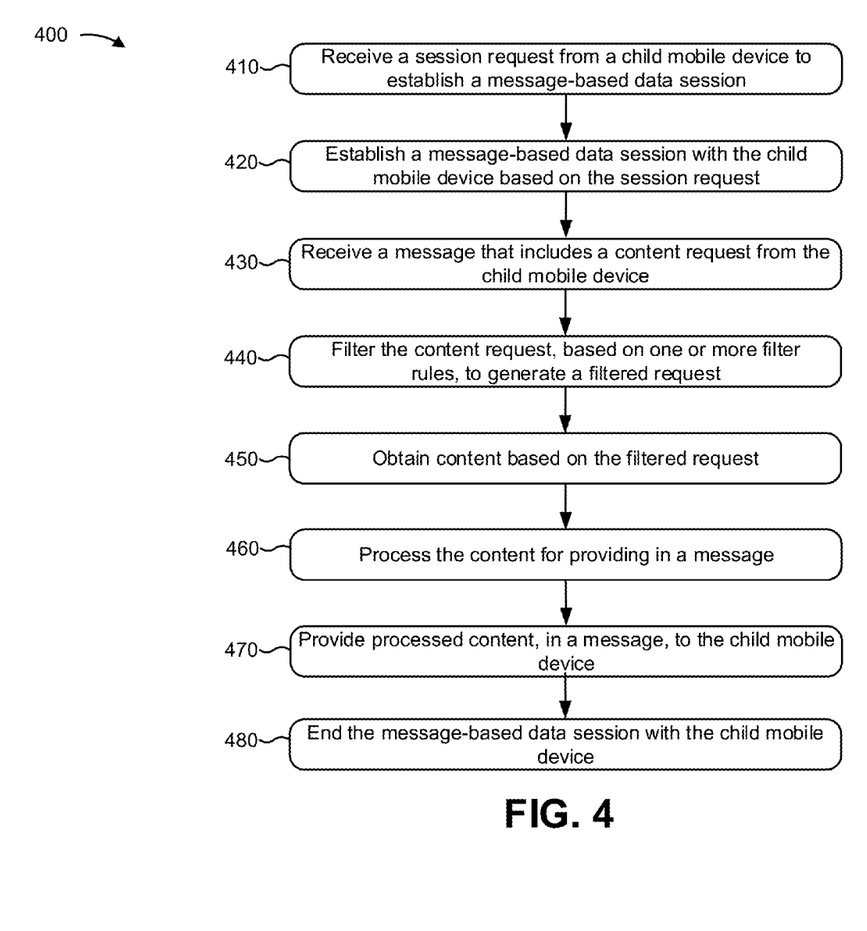
FIG. 4 is a flow chart of an example process for providing a message-based data service to a child mobile device.

FIG. 4 is a flow chart of an example process 400 for providing a message-based data service to a child mobile device. In some implementations, one or more process blocks of FIG. 4 may be performed by parent mobile device 210. In some implementations, one or more process blocks of FIG. 4 may be performed by another device or a set of devices separate from or including parent mobile device 210, such as child mobile device 220 and/or search engine device 230.

As shown in FIG. 4, process 400 may include receiving a session request from a child mobile device to establish a message-based data service (block 410). For example, parent mobile device 210 may receive, from child mobile device 220, a session request to establish a message-based data session. In some implementations, parent mobile device 210 may include the session request in a message, such as an SMS message, a network message, an email message, or the like. A message-based data session may be a session, between parent mobile device 210 and child mobile device 220, via which parent mobile device 210 may receive a content request from child mobile device 220 and/or may provide content to child device 220 based on a content request. The content may be information (e.g., a search result, location information, database information, audio content (which may be converted into text), etc.) that parent mobile device 210 may obtain via a data connection (e.g., a cellular data connection, a wireless Internet connection, etc.). Parent mobile device 210 may provide the content to child mobile device 220 in a message (e.g., an SMS message), which may permit parent mobile device 210 to control access to the content and/or data usage by child mobile device 220. Parent mobile device 210 may perform translation, conversion, and/or another format change operation, that may change the requested content from a format other than textual, into a textual format. Parent mobile device 210 may convert the textual content into a format for efficient transmission to the child mobile device 220 according to a messaging protocol, such as SMS, or the like. For example, if a subscription plan charges a subscriber for each SMS message (either transmitted or received), parent mobile device 210 may form a particular quantity of words of the desired textual content into a message, before sending one of multiple messages. On the other hand, if a subscription plan provides unlimited sending or receiving of messages, parent mobile device 210 may intelligently form messages so that a given message does not contain part of a last sentence of a first paragraph and/or part of a next sentence of a next paragraph. In such a scenario, a control application, running on parent mobile device 210, may interact with one or more of a text editor application, a speech recognition application, a grammar and spelling checker application, and/or an SMS application, to determine how best to form and package the desired content into one or more messages before transmitting the one or more messages to child mobile device 220.

Parent mobile device 210 and child mobile device 220 may be associated with a particular subscriber, a particular cellular data plan, or the like. For example, parent mobile device 210 may be associated with and/or used by a parent who controls a cellular data plan, and child mobile device 220 may be associated with a person who is a child of the parent. As another example, parent mobile device 210 may be associated with and/or used by an employer who controls a cellular data plan, and child mobile device 220 may be associated with and/or used by one or more employees of the employer. As yet another example, parent mobile device 210 may be used by a teacher who controls a cellular data plan, and child mobile device 220 may be used by one or more students of the teacher. In short, parent mobile device 210 may be associated with a subscriber who controls a cellular data plan, and child mobile device 220 may be associated with a user other than the subscriber, in some implementations.

In some implementations, parent mobile device 210 and child mobile device 220 may share a cellular data plan, such as a shared family plan, a shared business plan, or the like. The cellular data plan may permit a limited amount of cellular data usage by parent mobile device 210 and/or child mobile device 220 (e.g., a combined data usage of five gigabytes per month by both parent device 210 and child mobile device 220, a data usage of two gigabytes per month by child mobile device 220, a data usage of one gigabyte in total by child mobile device 220, etc.) before a subscriber associated with the cellular data plan accrues an additional charge. A user of parent mobile device 210 may want to restrict usage of the limited amount of cellular data by child mobile device 220, and parent mobile device 210 may configure a control application of child mobile device 220 to provide a message-based data service to child mobile device 220, as described in more detail elsewhere herein.

Parent mobile device 220 may receive a session request based on preferences associated with a control application, in some implementations. For example, the preferences may specify a threshold data usage at which to request a message-based data session (e.g., one gigabyte of cellular data used by child mobile device 220, ten gigabytes of cellular data used in total by parent mobile device 210 and child mobile device 220, etc.), a range of time during which to request a message-based data session (e.g., during school hours, between midnight and 6 a.m., on weekdays, etc.), a location at which to request a message-based data session (e.g., at a school, at a job site, outside a coverage area, etc.), or the like.

In some implementations, the control application may be hosted by parent mobile device 210. Additionally, or alternatively, the control application may be hosted by child mobile device 220. In some implementations, parent mobile device 210 and child mobile device 220 may both host a control application. A control application hosted by parent mobile device 210 may provide preferences, information, or the like, to a control application hosted by child mobile device 220. Child mobile device 220 may perform an action based on the preferences, the information, or the like, such as filtering a content request, denying child mobile device 220 access to a cellular data connection, or the like.

In some implementations, parent mobile device 210 may receive the session request based on a user interaction with child mobile device 220. For example, child mobile device 220 may receive an interaction with a control application to cause child mobile device 220 to provide the session request. In some implementations, child mobile device 220 may receive the session request automatically (e.g., without user interaction). For example, child mobile device 220 may attempt to access content via a cellular data connection, and may generate and/or send the session request to parent mobile device 210 based on attempting to access the content. In this way, parent mobile device 220 may control access, by child mobile device 220, to content via a cellular data connection.

In some implementations, parent mobile device 210 may receive the session request based on child mobile device 220 being unable to access a cellular data service. For example, child mobile device 220 may be unable to access a cellular data service based on being outside of a coverage area of a cellular data plan, having exceeded a particular data usage threshold, being in an area without cellular data infrastructure, or the like. In such cases, child mobile device 220 may provide a session request to parent mobile device 210. In this way, parent mobile device 210 may provide message-based data services to child mobile device 220 in circumstances where child mobile device 220 is incapable of accessing a cellular data service.

In some implementations, parent mobile device 210 may authenticate child mobile device 220 and/or the session request. For example, parent mobile device 210 may authenticate a credential of child mobile device 220, may determine that the session request originates from child mobile device 220, that parent mobile device 210 and child mobile device 220 are associated with a particular cellular data plan, or the like. Based on authenticating child mobile device 220, parent mobile device 210 may selectively provide a message-based data service to child mobile device 220.

In some implementations, parent mobile device 210 may determine that child mobile device 220 is not entitled to a message-based data session. For example, parent mobile device 210 may fail to authenticate child mobile device 220, may determine that child mobile device 220 has reached a threshold quantity of message-based data sessions, a threshold quantity of content requests, or the like. In such cases, parent mobile device 210 may not establish a message-based data session with child mobile device 220. In some implementations, parent mobile device 210 may provide a notification, such as a message, to child mobile device 220, indicating that parent mobile device 210 is not establishing a message-based data session with child mobile device 220.

As further shown in FIG. 4, process 400 may include establishing a message-based data session with the child mobile device based on the session request (block 420). For example, based on the session request, parent mobile device 210 may establish a message-based data session with child mobile device 220. Parent mobile device 210 may receive a content request from child mobile device 220 via the message-based data session, may obtain content based on the content request, and may provide the content to child mobile device 220 in a message via the message-based data session.

In some implementations, parent mobile device 210 may establish a message-based data session with child mobile device 220 based on authenticating child mobile device 220. For example, parent mobile device 210 may authenticate child mobile device 220 (e.g., based on parent mobile device 210 and child mobile device 220 being associated with a particular cellular data plan, based on a session request originating from child mobile device 220, based on a credential provided by child mobile device 220, etc.). Based on authenticating child mobile device 220, parent mobile device 210 may establish a message-based data session with child mobile device 220. In some implementations, parent mobile device 210 may provide a message-based data session acknowledgment message to child mobile device 220, to indicate establishment of the message-based data session.

In some implementations, parent mobile device 210 may not establish a message-based data session. For example, parent mobile device 210 may fail to authenticate child mobile device 220, may determine that child mobile device 220 has exceeded a threshold quantity of session requests, or the like, and may not establish the message-based data session. Additionally, or alternatively, parent mobile device 210 may provide a message-based data service to child mobile device 220 without establishing a message-based data session. For example, parent mobile device 210 may receive a content request from child mobile device 220, may obtain content based on the content request, and may provide the content to child mobile device 220, without establishing a message-based data session with child mobile device 220.

As further shown in FIG. 4, process 400 may include receiving a message that includes a content request from the child mobile device (block 430). For example, parent mobile device 210 may receive a message from child mobile device 220. The message may include a content request. Parent mobile device 210 may filter the content request to remove prohibited keywords, may obtain content, and/or may provide the content to child mobile device 220 in a message.

In some implementations, child mobile device 220 may generate the message based on an attempt to access content via a cellular data connection. For example, child mobile device 220 may attempt to access content, such as a webpage, a service, a search engine, or the like, via a cellular data connection. Based on attempting to access the content, child mobile device 220 and/or a control application executing on child mobile device 220 may generate a content request based on the content, and may provide the content request to parent mobile device 210 (e.g., in an SMS message, etc.).

In some implementations, child mobile device 220 may generate the content request based on an interaction with a control application of child mobile device 220. For example, the control application may present a user with a variety of options to obtain a particular type of content (e.g., an option to perform an Internet search, an option to obtain a list of nearby restaurants, hospitals, retail stores, etc., an option to obtain information from a particular database, etc.). Child mobile device 220 may receive an interaction, from the user, to select a particular type of content from the variety of options. Based on the interaction and the particular type of content, child mobile device 220 may generate the content request, and may provide the content request to parent mobile device 210. In this way, parent mobile device 210 may provide content based on a selection of a particular type of content, which may simplify obtaining of the content and/or improve performance of parent mobile device 210.

In some implementations, the content request may include keywords and/or key phrases to enable parent mobile device 210 to obtain the content. For example, if child mobile device 220 attempts to access a list of movie show times, the content request may indicate to obtain content related to move show times (e.g., using a phrase such as "movie show times," a particular value associated with movie show times, etc.). As another example, if child mobile device 220 attempts to perform an Internet search, the content request may include a keyword for use by parent mobile device 210 to cause the Internet search to be performed (e.g., by search engine device 230).

In some implementations, the content request may include location information. For example, a content request for a list of restaurants near child mobile device 220 may indicate to obtain content related to the list of restaurants, and may include location information identifying a location of child mobile device 220. The location information may be determined based on user input, based on a global positioning system (GPS) component of child mobile device 220, or the like. In this way, parent mobile device 210 may obtain content based on location-based information, which may increase a variety of information that parent mobile device 210 may provide in the message-based data service.

As further shown in FIG. 4, process 400 may include filtering the content request, based on one or more filter rules, to generate a filtered request (block 440). For example, parent mobile device 210 may filter the content request based on one or more filter rules. In some implementations, parent mobile device 210 (e.g., a subscriber) may receive user input that specifies the one or more filter rules. Based on the one or more filter rules, parent mobile device 210 may, for example, remove or modify a keyword from a content request before obtaining content results based on the content request.

Based on a filter rule, parent mobile device 210 may perform an action with respect to a content request. For example, a filter rule may cause parent mobile device 210 to drop a content request, to remove a keyword from a content request, to store and/or provide information related to a content request, to increment a counter associated with a content request, or the like. In some implementations, parent mobile device 210 may perform a combination of the above actions.

In some implementations, a filter rule may relate to a content source and/or a content type. For example, the filter rule may cause parent mobile device 210 to drop a content request associated with a particular source (e.g., a particular webpage, a particular server, a particular network address, etc.), a particular content type (e.g., video content, audio content, adult content, political content, illegal content, non-educational content, etc.), or the like. In some implementations, a filter rule may relate to a quantity of content. For example, the filter rule may cause parent mobile device 210 to drop a content request that contains a threshold quantity of characters, keywords, or the like. In this way, parent mobile device 210 may conserve resources and/or cellular data usage of parent mobile device 210.

In some implementations, a user of parent mobile device 210 may specify one or more filter rules. For example, assume that a subscriber associated with parent mobile device 210 wants to prohibit access to sports content by child mobile device 220. In that case, the subscriber may specify (e.g., via a control application) a filter rule to restrict access to sports content. For example, parent mobile device 210 may receive an instruction to filter content requests including keywords such as "sports," "basketball," "football," or the like, and/or to filter content requests related to particular sources (e.g., a sports statistics webpage, a sports streaming webpage, etc.). In this way, parent mobile device 210 may use filter rules to control access by child mobile device 220 to specified content.

As further shown in FIG. 4, process 400 may include obtaining content based on the filtered request (block 450). For example, parent mobile device 210 may obtain content based on the filtered request. In some implementations, parent mobile device 210 may obtain the content by causing search engine device 230 to perform a search based on the filtered request. Parent mobile device 210 may provide the content to child mobile device 220 in a message (e.g., an SMS message), which may enable parent mobile device 210 to filter and/or limit data usage by child mobile device 220.

In some implementations, parent mobile device 210 may obtain the content by providing the filtered request to search engine device 230 as a search query. Parent mobile device 210 may receive search results based on the search query, and may provide the search results to child mobile device 220. Additionally, or alternatively, parent mobile device 210 may obtain content results from a database. For example, child mobile device 220 may provide a content request for content from a particular database, and parent mobile device 210 may obtain the content from the particular database. Additionally, or alternatively, parent mobile device 210 may obtain the information from an application. For example, child mobile device 220 may provide a content request for a list of nearby restaurants, and parent mobile device 210 may use a map application (e.g., of parent mobile device 220 or another device) to obtain the list of nearby restaurants. For example, parent mobile device 210 may automatically populate a user interface of the map application with information from the content request to obtain the list of nearby restaurants.

As further shown in FIG. 4, process 400 may include processing the content for providing in a message (block 460). For example, the content may include information that parent mobile device 210 cannot provide via text message, such as image files, audio files, video files, an interactive element, or the like. Additionally, or alternatively, the content may include information that is unrelated to the filtered request, a quantity of information that prevents parent mobile device 210 from providing the content results via text message, or the like. Additionally, or alternatively, the content may include information prohibited by a filter rule, such as adult content, illegal content, or the like. Parent mobile device 210 may process the content to a format amenable to providing via text message, and may remove unrelated information, prohibited information, or the like.

In some implementations, parent mobile device 210 may remove non-textual information from the content. For example, parent mobile device 210 may remove non-textual information, such as image files, audio files, video files, or the like, to enable parent mobile device 210 to provide the content to child mobile device 220 via text message.

In some implementations, parent mobile device 210 may summarize content by providing a relevant portion of the content, providing a summary of the content, or the like. For example, assume that parent mobile device 210 obtains an encyclopedia article based on a content request, and assume that the encyclopedia article exceeds a character limit of a text message. In that case, parent mobile device 210 may provide a relevant portion of the encyclopedia article, may identify and/or provide section headers of the encyclopedia article, may divide the encyclopedia article into portions and/or may provide the portions in a plurality of text messages, or the like.

In some implementations, parent mobile device 210 may filter and/or process the content based on preferences. For example, parent mobile device 210 may remove adult content, illegal content, or the like, based on preferences specified in a control application. As another example, assume that a subscriber specifies to provide only a first five search results to child mobile device 220. In that case, parent mobile device 210 may remove, from the content, search results after a fifth search result. In this way, parent mobile device 210 may filter and/or process content based on preferences specified in a control application, which may enable parent mobile device 210 to better control content provided to child mobile device 220.

As further shown in FIG. 4, process 400 may include providing processed content, in a message, to the child mobile device (block 470). For example, parent mobile device 210 may provide processed content to child mobile device 220. In some implementations, parent mobile device 210 may provide the processed content in a message (e.g., a text message, such as an SMS message, etc.). By providing content to child mobile device 220 in a message, parent mobile device 210 may reduce a quantity of data used by child mobile device 220, may monitor content that child mobile device 220 is attempting to access, may filter content that child mobile device 220 is attempting to access, and may ensure that child mobile device 220 has access to useful information via a non-cellular data connection.

As further shown in FIG. 4, process 400 may include ending the message-based data session with the child mobile device (block 480). For example, parent mobile device 210 may end the message-based data session with child mobile device 220. In some implementations, parent mobile device 210 may end the message-based data session based on providing the processed content to child mobile device 220. In some implementations, parent mobile device 210 may end the message-based data session after providing multiple messages with processed content. For example, parent mobile device 210 may provide a threshold quantity of messages and/or processed content before ending the message-based data session. Additionally, or alternatively, parent mobile device 210 may end the message-based data session based on receiving a message, from child mobile device 220, indicating to end the message-based data session.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. In some implementations, block 410, block 420, and/or block 480 may be omitted from process 400.

FIGS. 5A-5D are diagrams of an example implementation 500 relating to example process 400 shown in FIG. 4. FIGS. 5A-5D show an example of providing a message-based data service to a child mobile device. For the purposes of FIGS. 5A-5D, assume that parent mobile device 210 and child device 220 each host a control application. Assume that parent mobile device 210 and child mobile device 220 are associated with a particular cellular data plan, and assume that a subscriber of the particular cellular data plan uses parent mobile device 210. Assume further that the operations described in connection with FIG. 5A-5D are performed at 1:00 p.m. (e.g., during school hours).

Figure 5A:
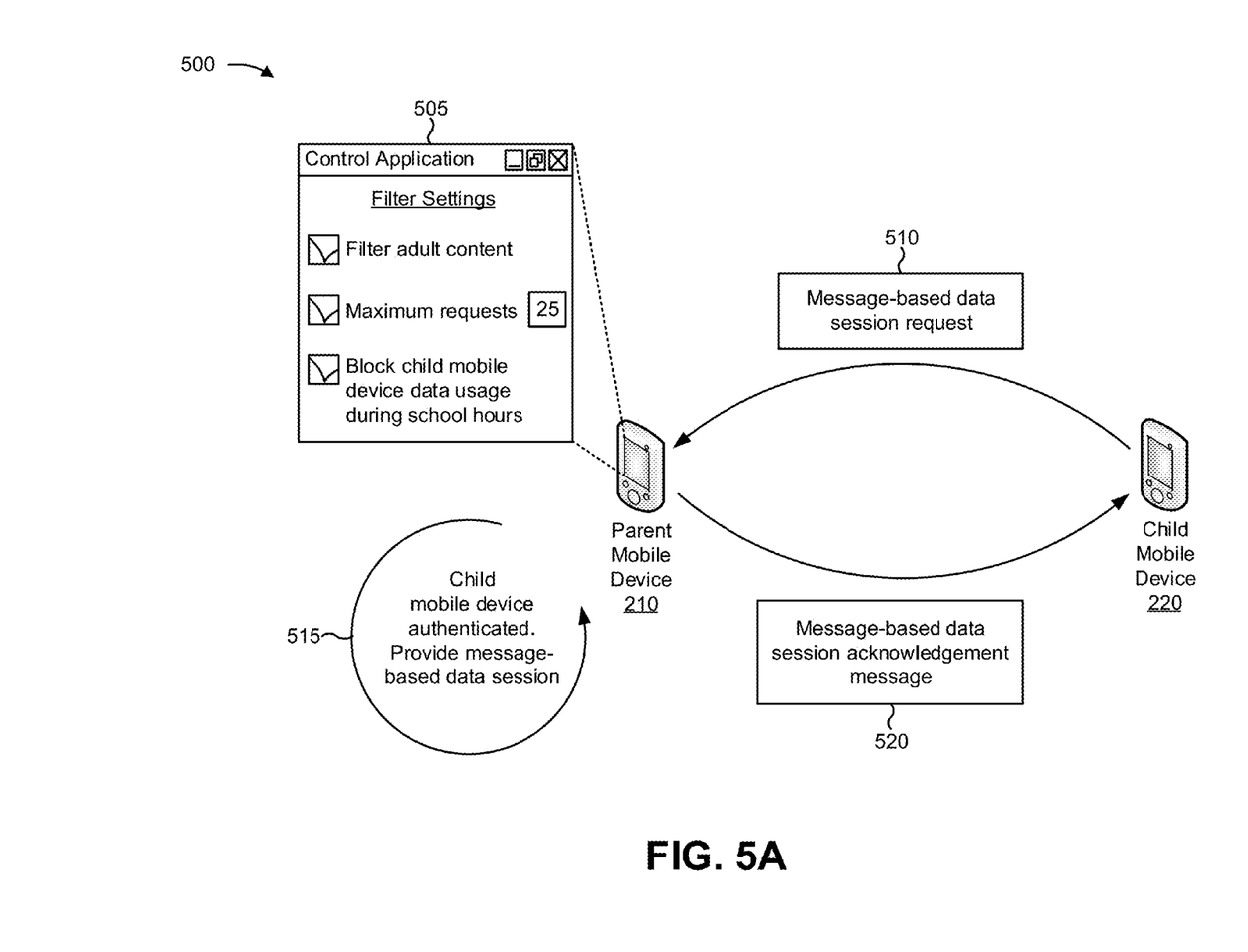
FIGS. 5A-5D are diagrams of an example implementation relating to the example process shown in FIG. 4.

As shown in FIG. 5A, and by reference number 505, parent mobile device 210 may host a control application. As further shown, the control application may allow a user to input preferences for providing a message-based data service. As shown, parent mobile device 210 may receive a first preference to filter adult content. Based on the first preference to filter adult content, parent mobile device 210 may remove keywords related to adult content from content requests and/or may remove adult content when processing obtained content. As further shown, parent mobile device 210 may receive a second preference that identifies a maximum quantity of content requests to accept from child device 220 (e.g., 25 content requests). Based on the second preference, parent device 210 may drop a content request and/or may not establish a message-based data session from child mobile device 220, in situations when child mobile device 220 has previously requested at least the maximum quantity of content requests within a particular time period.

As shown, parent mobile device 210 may receive a third preference to block cellular data usage by child mobile device 220 during school hours. Based on the third preference, child mobile device 220 may be denied access to cellular data services during school hours. For example, parent mobile device 210 may provide information indicating the third preference to a control application hosted by child mobile device 220, may provide the information indicating the third preference to a network administrator for enforcement, or the like.

As shown by reference number 510, based on cellular data usage by child mobile device 220 being blocked during school hours, child mobile device 220 may provide, to parent mobile device 210, a session request (e.g., shown as "message-based data session request"). Assume that the session request requests that parent mobile device 210 establish a message-based data session with child mobile device 220. As shown by reference number 515, parent mobile device 210 may authenticate child mobile device 220. Assume that parent mobile device 210 authenticates child mobile device 220 by determining that child mobile device 220 is associated with the same cellular data plan as parent mobile device 210. As further shown, based on authenticating child mobile device 220, parent mobile device 210 may establish a message-based data session with child mobile device 220. As shown by reference number 520, parent mobile device 210 may provide a message-based data session acknowledgment message to child mobile device 220.

Figure 5B:
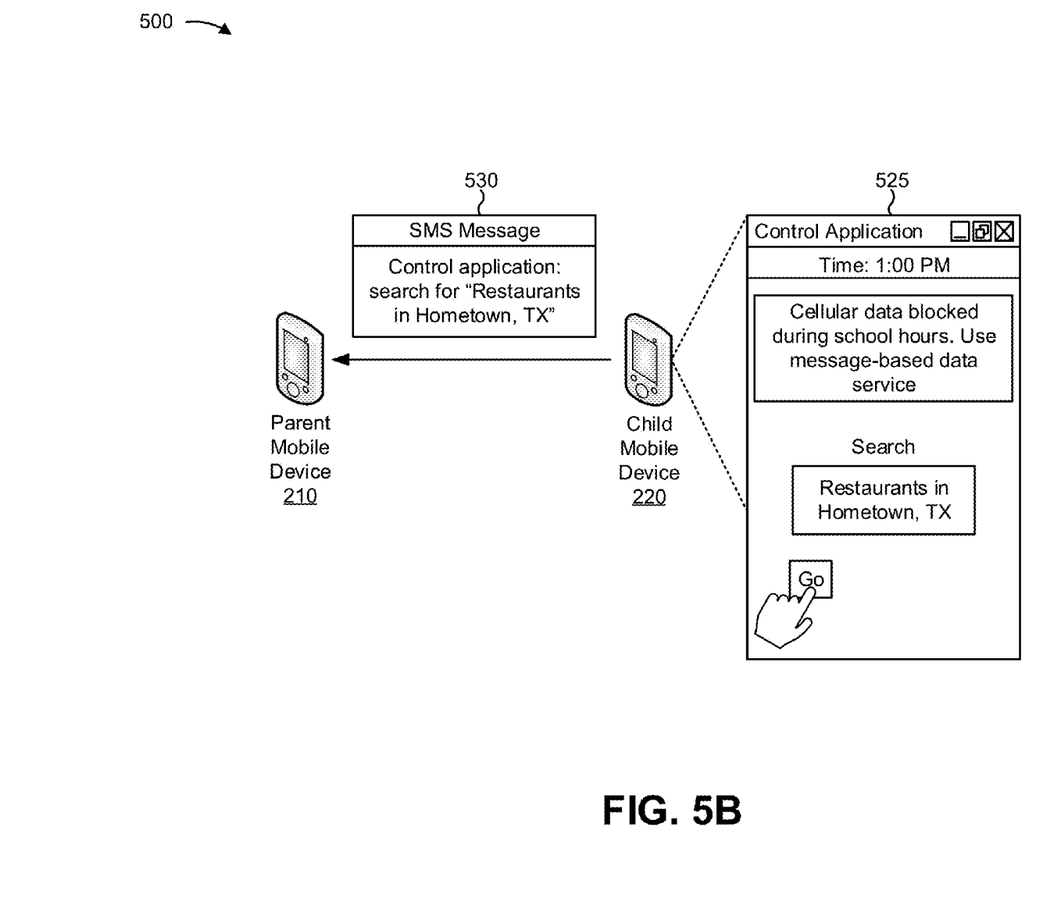

As shown in FIG. 5B, and by reference number 525, child mobile device 220 may be denied access to a cellular data service during school hours based on the third preference. As shown, child mobile device 220 may receive an interaction to cause child mobile device 220 to generate a content request. Here, child mobile device 220 receives a request to perform a search for restaurants in Hometown, Tex. As shown by reference number 530, child mobile device 220 may generate and provide, to parent mobile device 210, an SMS message that includes a content request (e.g., "Restaurants in Hometown, Tex.").

Figure 5C:
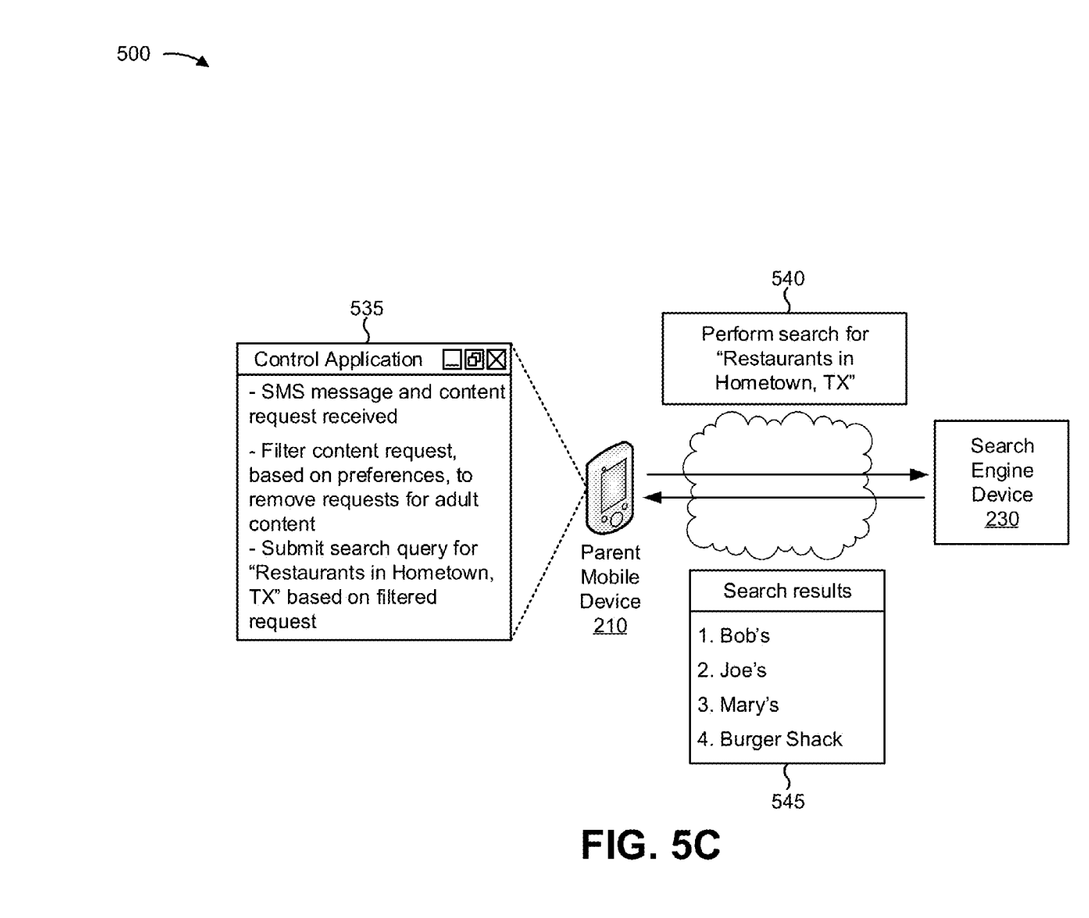

As shown in FIG. 5C, and by reference number 535, parent mobile device 210 receives the SMS message and the content request. As further shown, parent mobile device 210 filters the content request, based on the preferences shown in connection with reference number 505, to remove keywords related to adult content. Here, the content request does not relate to adult content, so parent mobile device 210 does not filter the content request. As shown by reference number 540, parent mobile device 210 may submit a search query to search engine device 230 based on the filtered request (e.g., "Restaurants in Hometown, Tex."). As shown by reference number 545, parent mobile device 210 may receive search results based on submitting the search query to search engine device 230 (e.g., "1. Bobs; 2. Joe's; 3. Mary's; 4. Burger Shack).

Figure 5D:
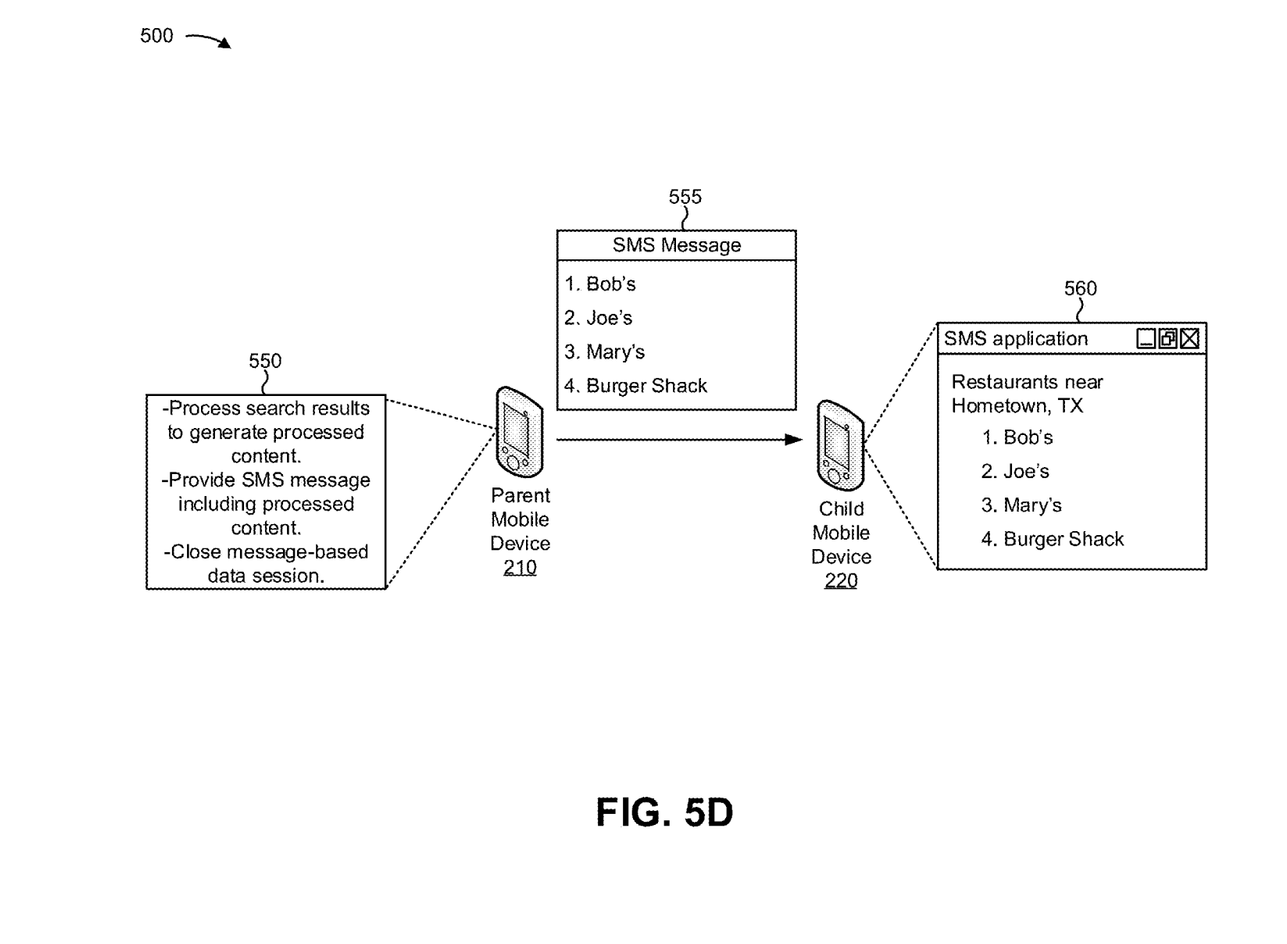

As shown in FIG. 5D, and by reference number 550, parent mobile device 210 may process the search results to generate processed content. Assume that parent mobile device 210 processes the search results by extracting text from the search results, and by removing image files, audio files, video files, interactive objects, and the like, from the search results. As further shown, parent mobile device 210 may close the message-based data session after providing the SMS message to child mobile device 220. As shown by reference number 555, parent mobile device 210 may provide the processed content to child mobile device 220 in an SMS message. As shown by reference number 560, child mobile device 220 may receive the SMS message, and may provide the processed content for display via an SMS application of child mobile device 220.

As indicated above, FIGS. 5A-5D are provided merely as an example. Other examples are possible and may differ from what was described with regard to FIGS. 5A-5D.

Implementations described herein may permit a parent mobile device to provide filtered and/or processed content to a child mobile device via text message. The child mobile device may request the content in a message to the parent device, rather than obtaining the content using a cellular data network, which may enable the parent mobile device to better control cellular data usage by the child mobile device. The parent mobile device may specify preferences for obtaining and/or accessing content, which may enable the parent mobile device to control types of content, sources of content, a quantity of requests of content, or the like, by the child mobile device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   receive one or more preferences for providing a message-based data service,
      the message-based data service communicating using text-based messaging;
   provide, based on receiving the one or more preferences, information associated with the one or more preferences to a mobile control application of a mobile device,
      the mobile control application prohibiting access, by the mobile device, to a cellular data network based on the one or more preferences and based on at least one of:
         a location of the mobile device, or
         a combined data usage of the device and the mobile device, and
      the mobile control application limiting the mobile device to only obtaining data using the message-based data service;
   receive, in a first text message, from the mobile device, and as a result of the mobile control application prohibiting access to the cellular data network, a content request,
      the content request identifying content to be obtained via a data connection;
   filter, based on receiving the content request and based on the one or more preferences, the content request to generate a filtered request;
   obtain, based on filtering the content request, the content via the data connection;
   process, based on obtaining the content, the content to generate processed content for providing in a second text message; and
   provide, based on processing the content, the processed content to the mobile device in the second text message.

2. The device of claim 1, where the one or more processors are to:
   receive a session request from the mobile device,
      the session request requesting a message-based data session with which to provide the message-based data service;
   authenticate the mobile device; and
   establish the message-based data session based on the session request and based on authenticating the mobile device.

3. The device of claim 1,
where the one or more preferences are received by a device control application,
the device control application being hosted by the device, and
the device control application being associated with the mobile control application that is hosted by the mobile device; and
where the one or more processors are further to:
provide information associated with the one or more preferences to the mobile control application.

4. The device of claim 1,
where the one or more preferences indicate a data usage threshold associated with the mobile device,
the data usage threshold indicating a threshold amount of cellular data that the mobile device is permitted to use; and
where the mobile device is prohibited from accessing the cellular data network based on the mobile device having used greater than the threshold amount of cellular data.

5. The device of claim 1,
where the content request includes a keyword;
where the one or more processors are further to:
provide the keyword to a search engine device; and
where the one or more processors, when obtaining the content, are to:
receive content from the search engine device,
the content including one or more search results based on the keyword.

6. The device of claim 1, where the device and the mobile device are associated with a particular cellular data plan.

7. The device of claim 1,
where the content relates to a particular location;
where the one or more processors, when receiving the content request, are to:
receive, in association with the content request, location information that identifies the particular location; and
where the one or more processors, when obtaining the content, are to:
obtain the content based on the location information.

8. A non-transitory computer-readable medium storing instructions, the instructions comprising:
one or more instructions that, when executed by one or more processors of a device, cause the one or more processors to:
receive one or more preferences related to providing a message-based data service,
the message-based data service communicating using text-based messaging;
provide, based on receiving the one or more preferences, information associated with the one or more preferences to a mobile control application of a mobile device,
the mobile control application prohibiting access, by the mobile device, to a cellular data network based on the one or more preferences and based on a combined data usage of the device and the mobile device, and
the mobile control application limiting the mobile device to only obtaining data using the message-based data service;
receive, from the mobile device and as a result of the mobile control application prohibiting access to the cellular data network, a content request via a first text message,
the content request requesting content to be obtained via a data connection;
filter, based on receiving the content request, the content request to generate a filtered request;
obtain, based on filtering the content request, the content based on the filtered request;
process, based on obtaining the content, the content to generate processed content; and
provide, based on processing the content, the processed content to the mobile device via a second text message.

9. The non-transitory computer-readable medium of claim 8,
where the one or more preferences identify a data usage threshold,
the data usage threshold indicating a threshold amount of cellular data that the mobile device is permitted to use; and
where the mobile device is prohibited from accessing the cellular data network based on the data usage threshold.

10. The non-transitory computer-readable medium of claim 8,
where the one or more preferences indicate a filter rule for filtering the content request; and
where the one or more instructions, that cause the one or more processors to filter the content request or process the content, further cause the one or more processors to:
filter the content request based on the filter rule; or
filter the content based on the filter rule.

11. The non-transitory computer-readable medium of claim 10, where the one or more instructions, that cause the one or more processors to filter the content request, cause the one or more processors to:
perform an action with respect to the content request,
the action including at least one of:
dropping the content request,
removing at least some of the content request,
providing a notification for display to a user of the device,
providing a notification to a network administrator,
causing a notification to be displayed by the mobile device, or
incrementing a counter.

12. The non-transitory computer-readable medium of claim 8,
where the one or more instructions, that cause the one or more processors to provide the information associated with the one or more preferences, cause the one or more processors to:
provide the information associated with the one or more preferences to a network administrator to permit the network administrator to deny access by the mobile device to the cellular data network.

13. The non-transitory computer-readable medium of claim 8,
where the content relates to a location;
where the one or more instructions, that cause the one or more processors to receive the content request, cause the one or more processors to:
receive, in association with the content request, location information that identifies the location; and
where the one or more instructions, that cause the one or more processors to obtain the content, further cause the one or more processors to:
obtain the content based on the location information.

14. The non-transitory computer-readable medium of claim 8, where the one or more preferences are received by a device control application,
   the device control application being hosted by the device, and
   the device control application being associated with the mobile control application that is hosted by the mobile device; and
where the one or more instructions further cause the one or more processors to:
   provide the information associated with the one or more preferences to the mobile control application.

15. A method, comprising:
receiving, by a device, one or more preferences for providing a message-based data service to a mobile device,
   the message-based data service communicating using text-based messaging;
providing, by the device, information associated with the one or more preferences to a control application of the mobile device,
   the control application prohibiting access, by the mobile device, to a cellular data network based on the one or more preferences and based on a location of the mobile device, and
   the control application limiting the mobile device to only obtaining data using the message-based data service;
receiving, by the device, from the mobile device, and as a result of the control application prohibiting access to the cellular data network, a content request,
   the content request including a request for content to be acquired by the device via the cellular data network;
obtaining, by the device and based on the content request, the content;
processing, by the device, the content to generate processed content,
   the content being processed for providing in a text message; and
providing, by the device and to the mobile device, the processed content in the text message.

16. The method of claim 15, further comprising:
filtering the content request by removing, from the content request, one or more keywords included in the content request based on the one or more preferences.

17. The method of claim 15, where processing the content comprises removing at least some of the content based on the one or more preferences.

18. The method of claim 15, further comprising:
providing, to a search engine device, one or more keywords or key phrases included in the content request;
where obtaining the content comprises:
   receiving the content based on the one or more keywords or key phrases; and
the method further comprising:
   filtering the content based on the one or more preferences.

19. The method of claim 15,
where the content relates to a particular location;
where receiving the content request includes:
   receiving, in association with the content request, location information that identifies the particular location; and
where obtaining the content includes:
   obtain the content based on the location information.

20. The method of claim 15, where processing the content comprises:
producing a summary of the content; and
where providing the processed content comprises:
   providing the summary of the content in the text message.

* * * * *